Patented Sept. 26, 1950

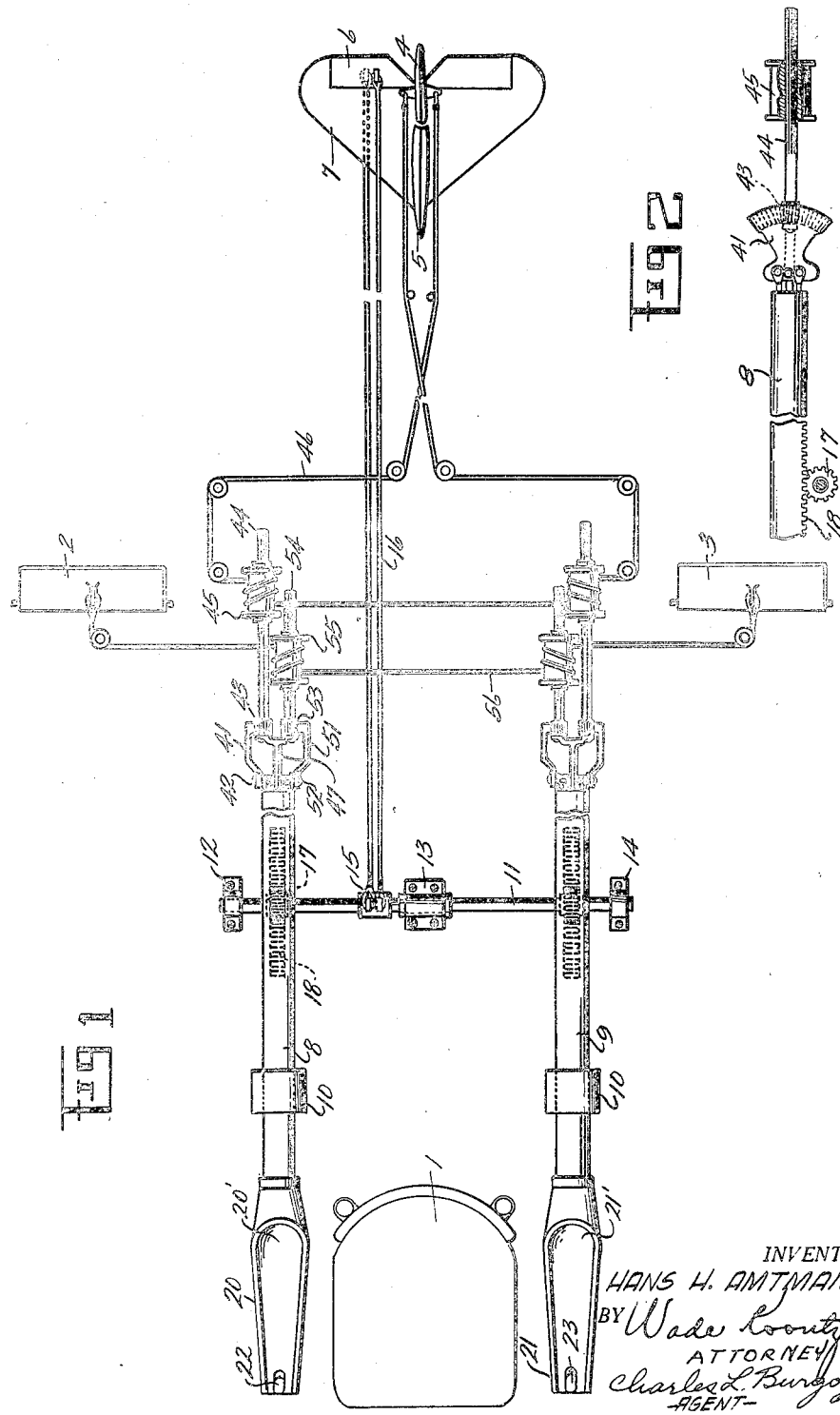

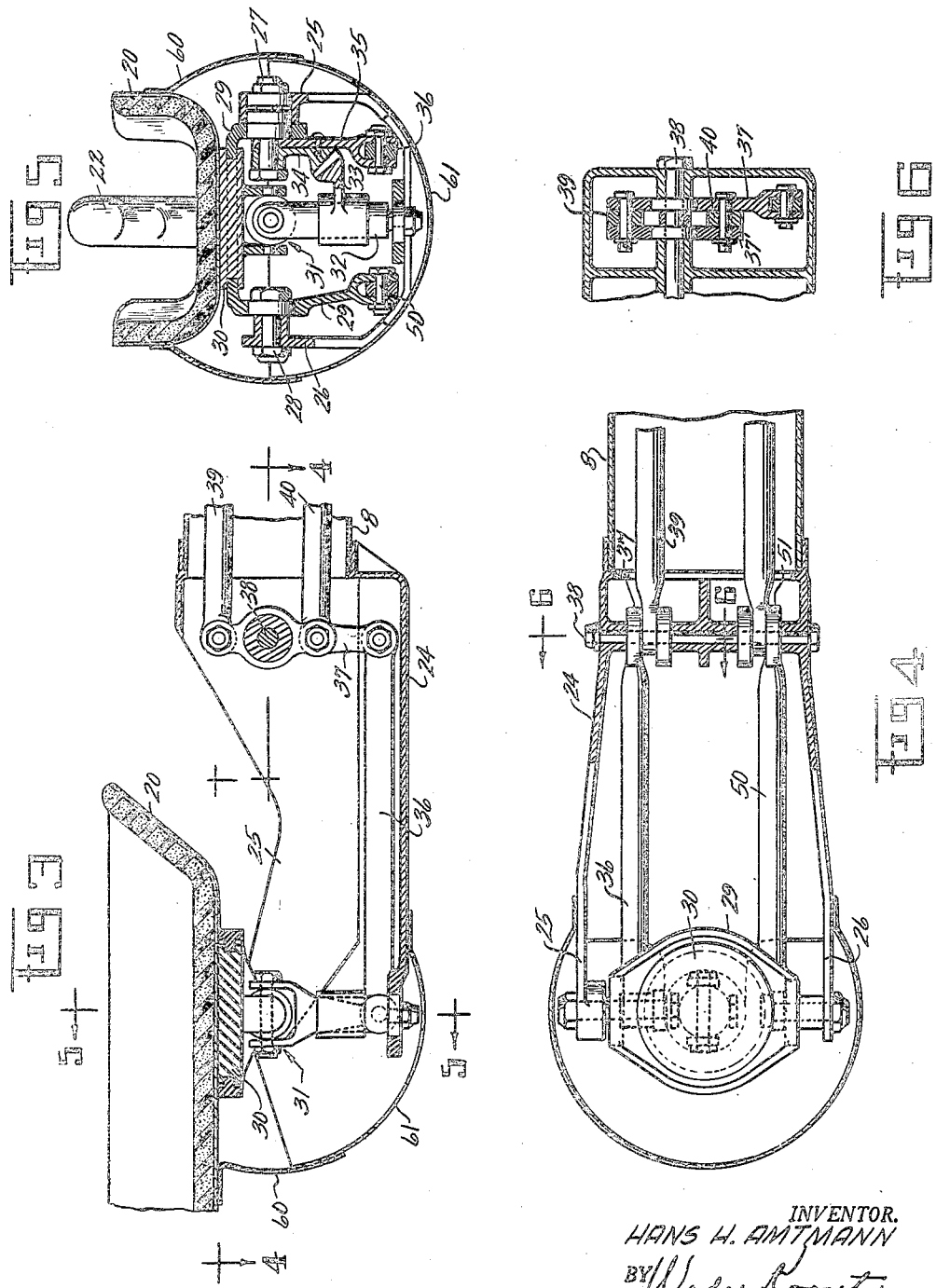

2,523,262

UNITED STATES PATENT OFFICE 2,523,262

THREE-DIMENSIONAL AIRCRAFT CONTROL SYSTEM, INCLUDING ARMREST CONTROL MEMBERS

Hans H. Amtmann, Hamburg, Germany

Application May 3, 1949, Serial No. 91,208

5 Claims. (Cl. 244—83)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to a three dimensional aircraft control system including control members in the form of arm rests located at both sides of the pilot.

The primary object of the invention is to provide a system of aircraft control wherein the control members manipulated by the pilot are located at both sides of the pilot's seat and can not obstruct the line of sight forwardly of the pilot.

A further object of the invention is to provide a three dimensional aircraft control system wherein all aircraft movements deviating from straight ahead level flight are effected by movement of one or a pair of control members which are in the form or arm rests at the sides of the seated pilot.

Another object of the invention is to provide a three dimensional aircraft control system wherein arm rests at the sides of the pilot are adapted for manipulation in a manner most appropriate for the aircraft movements ensuing as a result of the arm rest movements.

Another object of the invention is to provide a coordinated system of three dimensional aircraft control in which conveniently positioned arm rests may be shifted in fore-and-aft translation to effect elevator control, may be tilted about transverse axes to effect aileron control and may be turned about vertical axes to effect rudder control.

Another object of the invention is to provide a novel system of aircraft control in which all aircraft control is effected by movement of arm engaging elements and in which only a single such element may effect control when necessary.

The above and other objects of the invention will become apparent upon reading the following detailed description of the invention in conjunction with the accompanying drawings, in which:

Fig. 1 is a schematic plan view to show the general arrangement of the control system with respect to the usual aircraft control surfaces or members.

Fig. 2 is a fragmentary elevational view of a portion of the control system.

Fig. 3 is a vertical central cross sectional view of a portion of the control system adjacent to one arm rest.

Fig. 4 is a horizontal cross sectional view of a portion of the control system adjacent to one arm rest and is taken on line 4—4 of Fig. 3.

Fig. 5 is a transverse cross sectional view taken on line 5—5 of Fig. 3.

Fig. 6 is a transverse cross sectional view taken on line 6—6 of Fig. 4.

In modern aircraft the pilot is confronted with a greater array of instruments and indicators than ever before and because of higher speeds he should have as few distractions as possible. However the customary control column extending up from the cockpit floor tends to obstruct the pilot's view of the instrument panel as well as his sight ahead of the aircraft. Accordingly it would be advantageous to accomplish control of the aircraft by means near the pilot but not directly in front of him. In the present invention the pilot remains in his usual seated position and merely manipulates one or a pair of arm rests to control all movements of the aircraft. The system of control is similar in some respects to that disclosed in my copending application Serial No. 80,701 on a Prone Position Aircraft Control System, filed March 10, 1949.

Considering now a preferred construction of three dimensional aircraft control system including arm rest control members reference is first made to Fig. 1. The system is there shown apart from a complete aircraft but the spatial orientation of the system is like that found in a complete aircraft. Thus the cockpit or cabin will contain the control mechanism extending rearwardly of seat 1 at opposite sides thereof and the aircraft wings will have the ailerons 2 and 3 hingedly mounted thereon at the outer trailing edges to control the aircraft about the bank or roll axis. The rudder 4 will be hingedly mounted on the vertical stabilizer 5 to control the aircraft about the yaw axis and the elevator 6 will be hingedly mounted on the horizontal stabilizer 7 to control the aircraft about the pitch axis. The control members 2, 3, 4 and 6 carry the usual horns or rigid projections to which the control cables are attached, as will be apparent from the drawings.

The control system as seen in Fig. 1 comprises two similar control columns 8 and 9 extending in a fore-and-aft direction with respect to the aircraft. Each column is slidably supported for lengthwise movement by means of slide boxes or guides 10 fixed to the aircraft frame. The columns and guides include interfitting elements to prevent relative rotation therebetween. In order to coordinate the sliding movement of the columns with the aircraft elevator 6 there is provided a cross-shaft 11 mounted to turn in fixed bearings 12, 13 and 14 and having oppositely extending crank arms secured thereon. From the crank arms the cables 15 and 16 extend rearwardly to connect with the elevator 6. Where the shaft 11 passes under the columns there are pinions 17 secured rigidly thereon which mesh with the rack teeth formations 18 on the lower sides of the columns. Thus the columns 8 and 9 must slide in unison at all times because they are both geared to the cross-shaft 11. Moving the columns 8 and 9 forwardly exerts a pull on the cable 15 connected to the under side of elevator 6, at the same time the other cable 16 is slacked off. Thus the elevator is turned downwardly to cause the aircraft to dive. Moving the columns 8 and 9 rearwardly reverses the cable movement causing the aircraft to climb. These relative directions of aircraft movement correspond to the most natural manipulative movements of the controls, since in pushing the columns forwardly the pilot tends to look down while in pushing the columns rearwardly he tends to look up. This is due to the fact that the arm movements are accompanied by some corresponding movement of the body from the waist up.

At the forward ends thereof the columns 8 and 9 carry arm rests 20 and 21. The arm rests comprise shallow metal pans lined with sponge rubber and at the rearward end are provided with a sloping wall to form an elbow receiving pocket 20' or 21'. At the forward open end there are hand grips 22 and 23 to enable the pilot to obtain a firm grip on the pan structure when he so desires and especially if he is using only one arm for controlling the aircraft. The arm rests extend alongside the pilot's seat 1, as shown in Fig. 1, and have limited pivotal movement about vertical and transverse axes to effect rudder and aileron control. These control movements are effected independently of each and independently of the sliding movement of the columns in a fore-and-aft direction.

For a description of one arm rest 20 and the associated rudder and aileron control mechanism reference is made to Figs. 3, 4, 5 and 6. The hollow column 8 carries on its forward end a housing member 24 including forwardly extending sides 25 and 26 in which are secured opposite coaxial pivots 27 and 28. Mounted to turn on the pivots is a bracket 29 having depending sides and also a depending aileron actuating arm 29'. At its upper face the bracket 29 is fitted with a rotatable disk 30 having the under side of the arm rest 20 secured thereto rigidly. The under side of disk 30 is connected by a swivel joint 31 to a stub shaft 32 pivoted at its lower end to the bottom wall of housing 24. The shaft 32 has a bevel gear 33 rigidly secured thereon and meshed with a bevel gear 34 journaled on the transverse pivot 27. The gear 34 is secured to a depending lever 35 also journaled on the pivot 27. The lever 35 is connected by a rearwardly extending rod 36 to a compound lever 37 pivoted in housing 24 by a transverse shaft 38. As seen in Fig. 6 the lever 37 is pinned to a short parallel lever 37' and between these levers are pivotally secured a pair of actuating rods 39 and 40. The rods 39 and 40 extend rearwardly through the column 8 to connect with a gear segment 41 pivoted at 42 to the column 8. As seen in Fig. 2 the rods connect with the gear segment on opposite sides of the pivot point thereof and the gear segment meshes on its periphery with a pinion gear 43 fixed on shaft 44. The shaft 44 has a spline fit in a cable drum 45 having the rudder cable 46 trained therearound. Thus the parts are arranged so that a right or left turn of either arm rest 20 or 21 will effect a right or left turn of the aircraft by appropriate rudder action. The pinion 43 and connected shaft 44 are pivotally secured to an extension 47 on the column 8, so that on endwise sliding movement of the column the shaft 44 will move with the column while the drum 45 will remain in a relatively fixed position as the spline shaft 44 slides in or out of the drum.

Considering now the aileron control mechanism it will be noted that the depending arm 29' of bracket 29 has a rod 50 pivoted thereto and extending rearwardly to connect with a compound lever 51 pivoted on transverse shaft 38. Through a lever arrangement as shown in Fig. 6 the rod 50 operates a pair of push rods similar to rods 39 and 40 and effective to rock the gear segment 51 pivoted at 52 on the column 8. The gear segment 51 meshes with a pinion 53 rigid on the spline shaft 54 and the spline shaft which may slide within the cable drum 55 is thus adapted to drive the drum and exert a pull on aileron cable 56 in one direction or the other. The control mechanism, which is duplicated in the control column 9, is so arranged that the aileron 2 or 3 tips up when the arm rest 20 or 21 on the same side of the aircraft is pushed down and the arm rest on the other side is tipped up. This action means that the wing will go down when the arm rest on the same side is turned downwardly. Since the elbow receiving ends of the arm rests are rearwardly of the transverse pivots 27 and 28, the arm rests may be tilted up by exerting a downward pressure with the elbow. All aileron movements are coordinated by the cable 56 so that as one aileron is pulled into an upwardly tilted position the other aileron is pulled into a downwardly tilted position. It should also be noted that tilting of the arm rests about the transverse pivots 27 and 28 in no way affects the rudder action obtained by rotating the arm rests about stub shaft 32. These movements are independent of each other but after a little practice the coordinated movements to cause properly banked turns and maneuvers come very naturally to a skilled pilot. All controlling may be accomplished by using only a single arm rest when it is necessary to attend to other controls on the aircraft, or when either arm becomes tired. The positioning of the pilot's arms at his side with the forearms in the arm rests promotes comfort and is less tiresome than leaning forward over a control column or stick.

As can be seen in Figs. 3 and 4 the mechanism under the arm rests may be completely enclosed by means of interfitting cup-like cover members 60 and 61 carried on the arm rests and supporting housings respectively. The cable drums mounted on spline shafts and adapted to actuate the rudder and aileron cables 46 and 56 are mounted in stationary bearing means (not shown) so that sliding movement of the columns 8 and 9 is possible at all times without causing any movement of the drums. To summarize the functional characteristics of the present three dimensional aircraft control system it is again pointed out that sliding movement of the columns 8 and 9 forwardly and rearwardly results in glide and climb movements respectively of the elevator 6. Right and left pivoting movements of the arm rests 20 and 21 together results in action of the rudder 4 to give right and left turning of the aircraft. Up and down pivoting movements of the arm rests 20 and 21 in opposite directions simultaneously results in dipping the wing on the same side as the arm rest which is turned downwardly and lifting the wing on the same side as the arm rest which is turned upwardly. Since the control mechanisms associated with each control column are linked together by control cables 46 and 56 and by cross-shaft 11, all aircraft control actions as described may be effected by actuating only one arm rest when this becomes necessary or desirable. To avoid this one-arm control as much as possible is preferred to place some control switches at the forward end of the arm rests adjacent to the hand grips 22 and 23. Such switches may control the engine throttle, trim tabs and aircraft cannon. The control system not only clears the cockpit space of the usual control column but because of the fact that the pilot may sit back in the seat in a natural position with his forearms supported in arm rests, the system is less tiring on the pilot than the more conventional column-controlled systems.

The embodiments of the invention herein shown and described are to be regarded as illustrative only and it is to be understood that the invention is susceptible to variations, modifications and changes within the scope of the appended claims.

I claim:

1. In an aircraft having an elevator, rudder and ailerons for effecting aircraft control about pitch, yaw and roll axes respectively, a control system comprising, a pair of spaced control columns extending fore-and-aft of the aircraft and each mounted for limited sliding movement in the direction of its length, an arm rest for each control column, means pivotally mounting an arm rest on each column for simultaneous rotation about a horizontal transverse axis and about a vertical axis with said arm rests extending along opposite sides of the aircraft pilot's seat for reception of the pilot's forearms, means operable by said control columns upon sliding movement thereof to operate said elevator, means operable by said arm rests upon movement thereof about the respective vertical axes to operate said rudder, and means operable by said arm rests upon movement thereof about the respective transverse axes to operate said ailerons.

2. In an aircraft having an elevator, rudder and a pair of ailerons for effecting aircraft control about pitch, yaw and roll axes respectively, a control system comprising, a pair of spaced control columns extending fore-and-aft of the aircraft and each mounted for limited sliding movement in the direction of its length, an arm rest for each control column, means pivotally mounting an arm rest on each column for simultaneous rotation about a horizontal transverse axis and about a vertical axis with said arm rests extending along opposite sides of the aircraft pilot's seat for reception of the pilot's forearms, means operable by said control columns upon sliding movement thereof to operate said elevator, means operable by said arm rests upon movement thereof about the respective vertical axes to operate said rudder and means operable by said arm rests upon movement thereof in opposite directions about the respective transverse axes to operate said pair of ailerons in opposite directions.

3. In an aircraft having an elevator, rudder and ailerons for effecting aircraft control about pitch, yaw and roll axes respectively, a control system comprising, a pair of spaced control columns extending fore-and-aft of the aircraft and each mounted for limited sliding movement in the direction of its length, an arm rest for each control column, means pivotally mounting an arm rest on the forward end of each column for simultaneous rotation about a horizontal transverse axis and about a vertical axis with said arm rests extending along opposite sides of the aircraft pilot's seat for reception of the pilot's forearms, a transversely extending horizontal shaft having means fixed centrally thereof for actuation of said elevator, means on said columns and said shaft for causing rotation of said shaft in response to sliding movement of said columns, means operable by said arm rests upon movement thereof about the respective vertical axes to operate said rudder, and means operable by said arm rests upon movement thereof about the respective transverse axes to operate said ailerons.

4. In an aircraft having an elevator, rudder and ailerons for effecting aircraft control about pitch, yaw and roll axes respectively, a control system comprising, a pair of spaced control columns extending fore-and-aft of the aircraft and each mounted for limited sliding movement in the direction of its length, means operable by said control columns upon sliding movement thereof to operate said elevator, actuating rods extending lengthwise through each of said columns, means at the aft end of each column actuated by at least one rod of each column for connection with rudder actuating means, means at the aft end of each column actuated by at least one other rod of each column for connection with aileron actuating means, an arm rest for each control column, means pivotally mounting an arm rest on the forward end of each column for simultaneous rotation about a horizontal transverse axis and about a vertical axis with said arm rests extending along opposite sides of the aircraft pilot's seat for reception of the pilot's forearms, and means under said arm rests to energize said actuating rods upon movement of said arm rests about the respective vertical and transverse axes to operate said rudder and said ailerons respectively.

5. In an aircraft having an elevator, rudder and ailerons for effecting aircraft control about pitch, yaw and roll axes respectively, a control system comprising, a pair of spaced control columns extending fore-and-aft of the aircraft and each mounted for limited sliding movement in the direction of its length, means operable by said control columns upon sliding movement thereof to operate said elevator, two pair of actuating slide rods extending lengthwise through each of said columns, means adjacent to the aft end of each column actuated by one pair of rods of each column for connection with rudder actuating means, means adjacent to the aft end of each column actuated by the other pair of rods of each column for connection with aileron actuating means, an arm rest for each control column, means pivotally mounting an arm rest on the forward end of each column for simultaneous rotation about a horizontal transverse axis and about a vertical axis with said arm rests extending along opposite sides of the aircraft pilot's seat for reception of the pilot's forearms, means to energize said one pair of rods of each column upon movement of said arm rests about the respective vertical axes, and means to energize said other pair of rods of each column upon movement of said arm rests about the respective transverse axes.

HANS H. AMTMANN.

REFERENCES CITED

The following references are of record in the file of this patent:

UNITED STATES PATENTS

| Number | Name | Date |
|---|---|---|
| 2,411,770 | Zimmerman | Nov. 26, 1946 |

FOREIGN PATENTS

| Number | Country | Date |
|---|---|---|
| 25,726 | Great Britain | of 1909 |
| 596,881 | Great Britain | Jan. 13, 1948 |